(12) United States Patent
Yamaguchi

(10) Patent No.: US 12,147,044 B2
(45) Date of Patent: Nov. 19, 2024

(54) OPTICAL MODULE AND HEAD-MOUNTED DISPLAY DEVICE

(71) Applicant: SEIKO EPSON CORPORATION, Tokyo (JP)

(72) Inventor: Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 491 days.

(21) Appl. No.: 17/681,094

(22) Filed: Feb. 25, 2022

(65) Prior Publication Data

US 2022/0276493 A1    Sep. 1, 2022

(30) Foreign Application Priority Data

Feb. 26, 2021 (JP) ................................ 2021-029757

(51) Int. Cl.
G02B 27/01 (2006.01)

(52) U.S. Cl.
CPC .... *G02B 27/0172* (2013.01); *G02B 2027/013* (2013.01)

(58) Field of Classification Search
CPC ........ G02B 27/0172; G02B 2027/0178; G02B 27/0176; G02B 27/017
See application file for complete search history.

(56) References Cited

U.S. PATENT DOCUMENTS

| 6,646,809 B1 * | 11/2003 | Ishino ................ G02B 27/0172 359/633 |
| 2014/0049833 A1 | 2/2014 | Totani et al. |
| 2020/0018966 A1 | 1/2020 | Komatsu et al. |

FOREIGN PATENT DOCUMENTS

| CN | 103676090 A | 3/2014 |
| CN | 110703441 A | 1/2020 |
| JP | 2014-038226 A | 2/2014 |

* cited by examiner

*Primary Examiner* — Ryan D Howard
(74) *Attorney, Agent, or Firm* — Oliff PLC

(57) ABSTRACT

A projection lens that is a first optical member configured to emit image light from an emission portion, the image light being incident on an image element, a prism mirror that is a second optical member configured to cause the image light from the projection lens to be incident from an incident portion, a combiner configured to reflect the image light from the prism mirror toward a pupil position, and a light blocking member supported around at least one of the incident portion of the prism mirror and the emission portion of the projection lens are provided, wherein when viewed from a direction perpendicular to an optical axis of the image light incident on the incident portion of the prism mirror, at least a portion of the incident portion of the prism mirror protrudes from the light blocking member toward the emission portion of the projection lens.

10 Claims, 11 Drawing Sheets

OPTICAL MODULE AND HEAD-MOUNTED DISPLAY DEVICE

The present application is based on, and claims priority from JP Application Serial Number 2021-029757, filed Feb. 26, 2021, the disclosure of which is hereby incorporated by reference herein in its entirety.

BACKGROUND

1. Technical Field

The present disclosure relates to an optical module that enables observation of a virtual image and a head-mounted display device including the optical module.

2. Related Art

As an optical engine that is incorporated into a head-mounted display device and allows observation of a virtual image, it is known to include a prism that changes an optical axis direction of image light, and a relay optical system that emits the image light and causes the image light to be incident on the prism (see JP-A-2014-38226). In this optical engine, the generation of ghosts is suppressed by disposing a light blocking member that blocks excess image light between a plurality of lenses constituting a projection lens.

In the device of JP-A-2014-38226, the image light is blocked using the light blocking member. When such a light blocking member is provided between the lens and the prism, it becomes difficult to shorten the distance between the lens and the prism. As a result, the distance between the lens and the prism increases, and stray light that enters through the space between the lens and the prism may degrade optical performance of the optical module.

SUMMARY

AN OPTICAL MODULE OR A HEAD-MOUNTED DISPLAY DEVICE ACCORDING TO AN ASPECT OF THE PRESENT DISCLOSURE INCLUDES AN IMAGE ELEMENT THAT EMITS AN IMAGE LIGHT; A FIRST OPTICAL MEMBER THAT INCLUDES A FIRST EMISSION PORTION EMITTING THE IMAGE LIGHT FROM THE IMAGE ELEMENT; A SECOND OPTICAL MEMBER THAT INCLUDES: AN INCIDENT PORTION ON WHICH THE IMAGE LIGHT FROM THE FIRST OPTICAL MEMBER IS INCIDENT, A SECOND EMISSION PORTION THAT EMITS THE IMAGE LIGHT, AND A REFLECTION PORTION THAT REFLECTS THE IMAGE LIGHT FROM THE INCIDENT PORTION TOWARD THE SECOND EMISSION PORTION; A COMBINER THAT REFLECTS THE IMAGE LIGHT FROM THE SECOND OPTICAL MEMBER TOWARD A PUPIL POSITION; AND A LIGHT BLOCKING MEMBER THAT IS SUPPORTED ON AT LEAST ONE SIDE OF A SIDE OF THE INCIDENT PORTION OF THE SECOND OPTICAL MEMBER AND A SIDE OF THE FIRST EMISSION PORTION OF THE FIRST OPTICAL MEMBER, AND THAT BLOCKS A PART OF THE IMAGE LIGHT, WHEREIN A PORTION OF THE INCIDENT PORTION OF THE SECOND OPTICAL MEMBER PROTRUDES FROM THE LIGHT BLOCKING MEMBER TOWARD THE FIRST EMISSION PORTION OF THE FIRST OPTICAL MEMBER WHEN VIEWED FROM A DIRECTION ALONG A NORMAL LINE OF A LATERAL CROSS SECTION THAT INCLUDES THE FIRST OPTICAL MEMBER, THE SECOND OPTICAL MEMBER, AND THE COMBINER.

DESCRIPTION OF EXEMPLARY EMBODIMENTS

First Exemplary Embodiment

Hereinafter, a first exemplary embodiment of an optical module and a head-mounted display device according to the present disclosure will be described with reference to the accompanying drawings.

Figure 1:
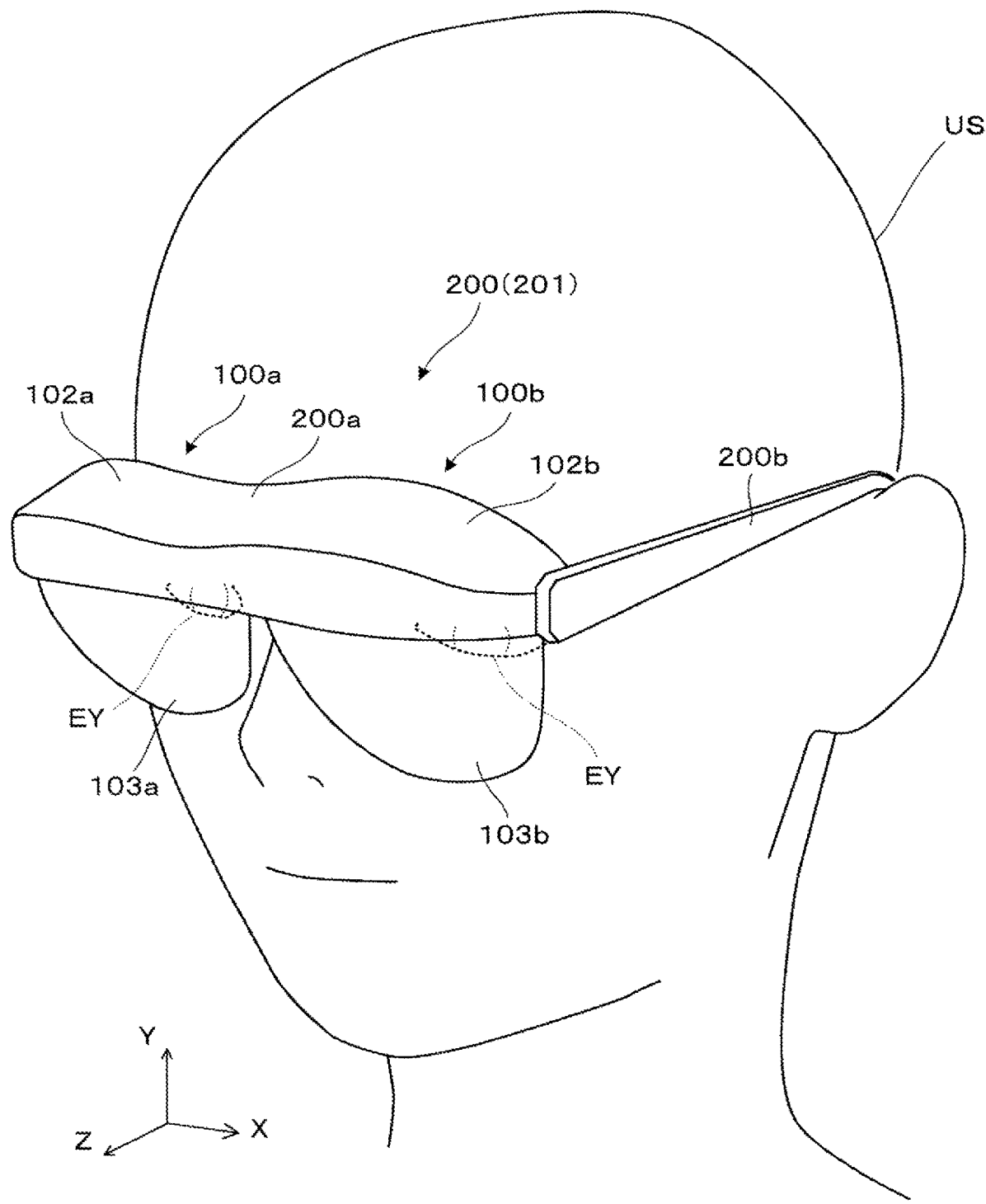
FIG. 1 is an external perspective view illustrating a mounting state of a HMD of a first exemplary embodiment.

FIG. 1 is a view illustrating a mounting state of an image display device 200. The image display device 200 is a head-mounted display device or a head-mounted display (hereinafter, also referred to as HMD) 201, and causes an observer or a wearer US who wears the image display device 200 to recognize an image as a virtual image. In FIG. 1, etc., X, Y, and Z are an orthogonal coordinate system, a +X direction corresponds to a horizontal direction in which the two eyes EY of the observer or wearer US wearing the image display device 200 or the HMD201 are aligned, a +Y direction corresponds to an upward direction orthogonal to the horizontal direction in which the two eyes EY of the wearer US are aligned, and a +Z direction corresponds to a direction to a front or a forward direction for the wearer US. A ±Y direction is parallel to a vertical axis or a vertical direction.

The image display device 200 includes a main body 200a disposed to cover the front of the wearer US and a pair of temple support devices 200b that support the main body 200a. The main body 200a, when functionally viewed, includes a first display device 100a for the right eye and a second display device 100b for the left eye. The first display device 100a includes a first display driving unit 102a disposed at an upper portion thereof, and a first combiner 103a that is shaped like a spectacle lens and covers the front of the eye. Similarly, the second display device 100b includes a second display driving unit 102b disposed at an upper portion thereof, and a second combiner 103b that is shaped like a spectacle lens and covers the front of the eye.

Figure 2:
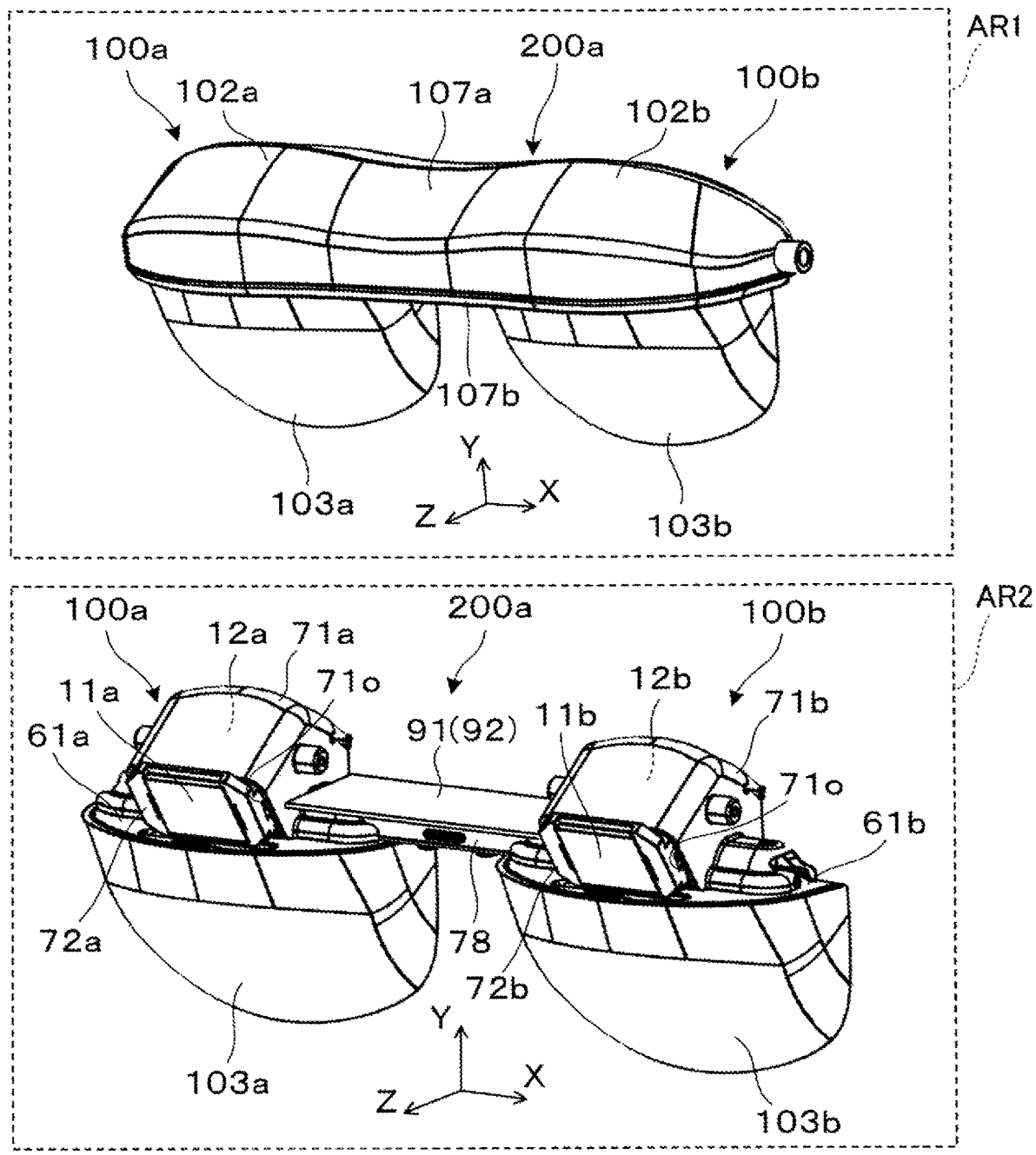
FIG. 2 illustrates a perspective view of a main body of the HMD and a perspective view of the interior with an exterior member removed.

The structure, etc. of the main body 200a of the image display device 200 will be described with reference to FIG. 2. In FIG. 2, a region AR1 is an external perspective view of the main body 200a, and a region AR2 is a perspective view with a top portion of the main body 200a exposed.

A pair of the display driving units 102a, 102b disposed on the +Y side or the upper side of the main body 200a are coupled and integrated, and are covered by a dome-shaped upper exterior member 107a elongated in the horizontal direction and a flat plate-shaped lower exterior member 107b. The first combiner 103a and the second combiner 103b have a shape such that an upper portion of a hemisphere protruding in the forward or the +Z direction is cut, and is disposed so as to protrude downward from the lower exterior member 107b.

The first display device 100a for the right eye includes a first image element 11a, a first optical system 12a, a first frame 61a, and the first combiner 103a. The first optical system 12a is covered with a first cover member 71a, which is an inner cover. The first image element 11a is disposed so as to close an opening 710 of the first cover member 71a, and is fixed to the first optical system 12a via a first holder 72a having a rectangular frame shape.

The second display device 100b for the left eye includes a second image element lib, a second optical system 12b, a second frame 61b, and the second combiner 103b. The second optical system 12b is covered with a second cover member 71b, which is an inner cover. The second image element 11b is disposed so as to close the opening 710 of the second cover member 71b, and is fixed to the second optical system 12b via the second holder 72b having a rectangular frame shape. The second display device 100b for the left eye has the same structure and function as the first display device 100a for the right eye. In other words, the second image element 11b is the same as the first image element 11a, the second optical system 12b is the same as the first optical system 12a, and the second combiner 103b is the same as the first combiner 103a.

The first display device 100a and the second display device 100b are coupled and fixed via a fixing member 78 therebetween. In other words, the fixing member 78 supports a pair of the frames 61a, 61b integrated into the pair of display devices 100a, 100b, and maintains a state in which the first display device 100a and the second display device 100b are relatively positioned. Specifically, the first frame 61a is coupled to one end of the rod-shaped fixing member 78 at the inner end near the second frame 61b, and the second frame 61b is coupled to the other end of the rod-shaped fixing member 78 at the inner end near the first frame 61a. The first frame 61a and the second frame 61b are semi-circular plate-shaped metal members, and are formed, for example, from a magnesium alloy. The fixing member 78 is also formed from, for example, a magnesium alloy. By forming the first frame 61a and the second frame 61b from a highly heat dissipating material such as a magnesium alloy, heat dissipation efficiency of heat generated by the image element 11a, etc. can be increased. By forming the fixing member 78 from a highly heat dissipating material such as a magnesium alloy, the first frame 61a and the second frame 61b can be cooled by heat dissipation.

A rectangular plate-shaped circuit board 91 is disposed above the fixing member 78 between the left and right display devices 100a, 100b. The circuit board 91 includes a control device 92 that controls display operation of the first image element 11a and the second image element 11b. The control device 92 outputs a drive signal corresponding to the display image to the left and right image elements 11a, 11b to control the display operation of the left and right image elements 11a, 11b. The control device 92 includes, for example, an IF circuit, a signal processing circuit, etc., and causes the left and right image elements 11a, 11b to display a two-dimensional image according to the image data or the image signal received from the outside. Although not illustrated, the control device 92 includes a main board that controls the operation of the first display device 100a and the operation of the second display device 100b. The main board may have, for example, an interface function that communicates with an external device (not illustrated) and performs signal conversion on a signal received from the external device, and an integrated function that links the display operation of the first display device 100a and the display operation of the second display device 100b.

Figure 3:
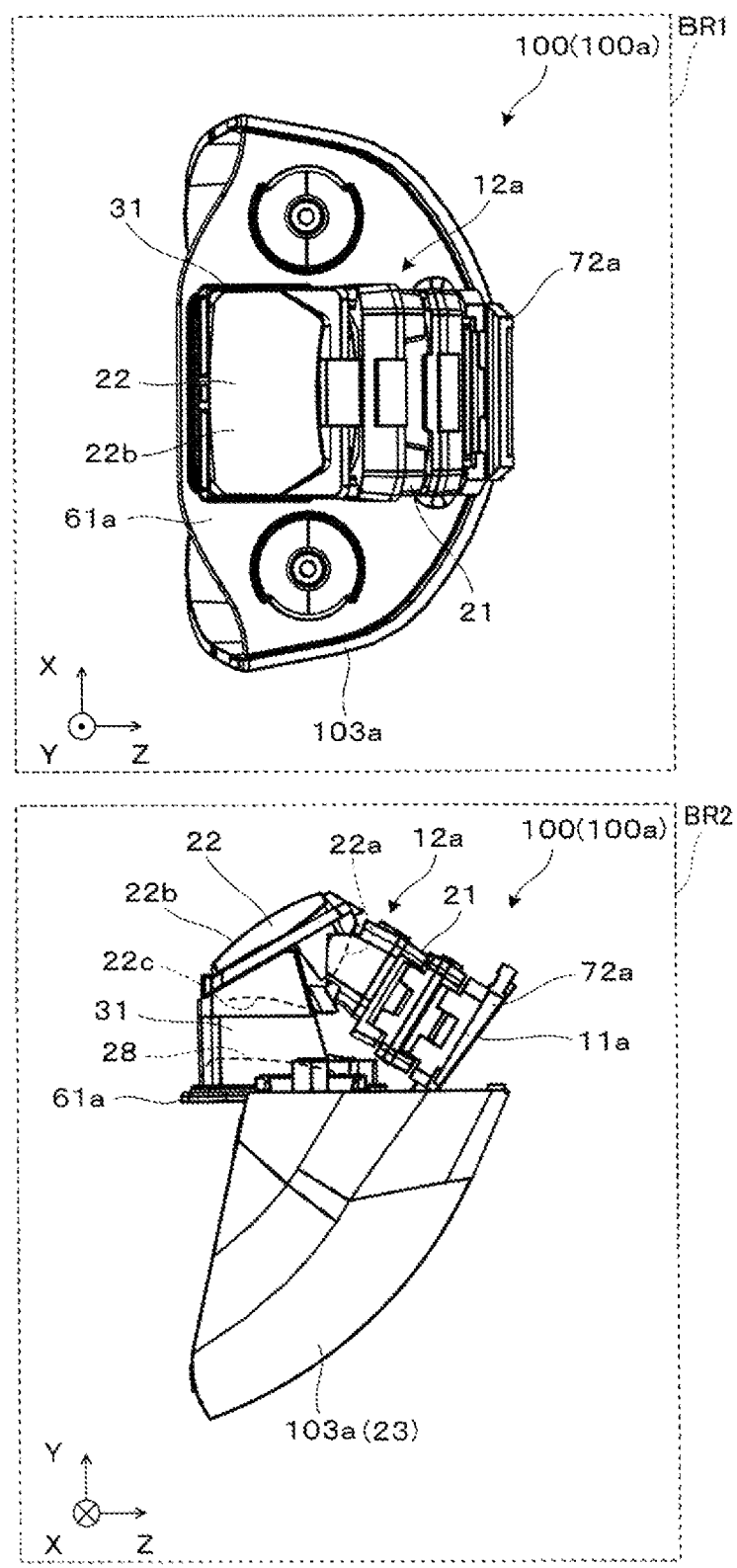
FIG. 3 illustrates a top view and a left side view of an optical module.

FIG. 3 illustrates an optical module 100 constituting the first display device 100a. In FIG. 3, a region BR1 is a top view of the optical module 100 and a region BR2 is a side view of the optical module 100. The first optical system 12a is fixed to an upper surface of the plate-shaped first frame 61a by adhesion, etc., and the first combiner 103a is fixed to the front half of the periphery of the first frame 61a by adhesion, etc. at an upper end thereof. The first optical system 12a includes a barrel 31 that supports an optical element. The barrel 31 is a support member disposed between the prism mirror 22 and the first combiner 103a, supports the prism mirror 22 at an upper portion on the +Y side, and is fixed to the first frame 61a via a wedge type optical element 28 at a lower portion. The prism mirror 22 that is a second optical member, supports a projection lens 21, which is a first optical member, on the rear side, that is, on the −Z side. The projection lens 21 supports the first image element 11a via the first holder 72a at an end on the opposite side of the prism mirror 22.

Figure 4:
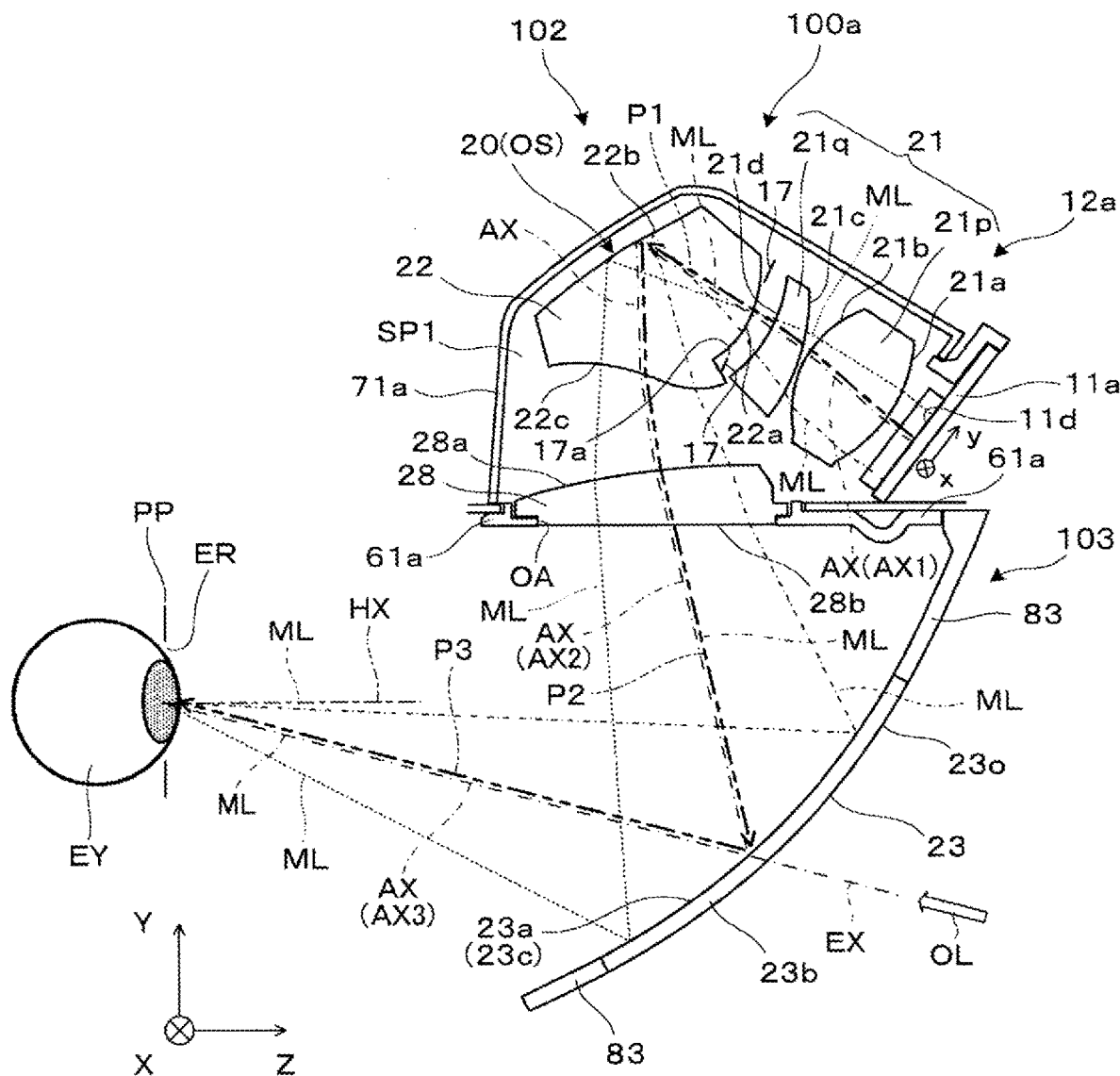
FIG. 4 is a conceptual side cross-sectional view illustrating an optical system within the HMD.

FIG. 4 is a side cross-sectional view illustrating an optical structure of the first display device 100a. The first display device 100a includes the first image element 11a and an imaging optical system 20. The imaging optical system 20 includes the projection lens 21, the prism mirror 22, the wedge type optical element 28, and a see-through mirror 23. A light blocking member 17 is disposed between the projection lens 21 and the prism mirror 22. The projection lens 21, the prism mirror 22, and the wedge type optical element 28 of the imaging optical system 20 correspond to the first optical system 12a illustrated in FIG. 3, etc., and the see-through mirror 23 corresponds to the first combiner 103a. The main body of the first image element 11a, the projection lens 21, the prism mirror 22, and the wedge type optical element 28 are fixed to the first frame 61a in a state of being positioned with each other. The main body of the first image element 11a, the projection lens 21, and the prism mirror 22 are accommodated in a space SP1 sandwiched between the first cover member 71a and the first frame 61a. The wedge type optical element 28 is disposed so as to be fitted into a step formed at the optical aperture OA of the first frame 61a, and the periphery of the optical aperture OA is kept airtight state.

The first image element 11a is a spontaneous light emission type display device. The first image element 11a is, for example, an organic EL (Organic Electro-luminescence) display, and forms a color still image or moving image on a two-dimensional display surface 11d. The first image element 11a is disposed along an x-y plane that is inclined by being slightly rotated about the X axis with respect to an X-Y plane. The first image element 11a is driven by the circuit board 91 to perform display operation. Without being limited to the organic EL display, the first image element 11a can be replaced with a micro LED display or a display device using an inorganic EL, an organic LED, a laser array, a quantum dot light emitting element, etc. Without being limited to a spontaneous light emission type imaging light generation device, the first image element 11a may include an LCD and another light modulation element, and may form an image by illuminating the light modulation element with a light source such as a backlight. As the first image element 11a, a LCOS (Liquid crystal on silicon, LCoS is a registered trademark), a digital micro-mirror device, etc. may be used instead of an LCD.

The projection lens 21 includes a first lens 21p and a second lens 21q. The first lens 21p includes an incident portion 21a and an emission portion 21b, and the second lens 21q includes an incident portion 21c and an emission portion 21d. The projection lens 21 receives image light ML emitted from the first image element 11a and causes the image light ML to be incident on the prism mirror 22. The projection lens 21 focuses the image light ML emitted from the first image element 11a into a state close to a parallel luminous flux. The prism mirror 22 has an incident portion 22a, an inner reflection portion 22b, and an emission portion 22c. The prism mirror 22 emits the image light ML incident from the front such that it is bent in a direction inclined with respect to a direction in which an incident direction is reversed (a direction of the light source seen from the prism mirror 22). The wedge type optical element 28 has a first surface 28a and a second surface 28b, and passes the image light ML emitted from the prism mirror 22 toward the see-through mirror 23. The see-through mirror 23 has a reflection portion 23a and an outer surface 23o. The see-through mirror 23 enlarges an intermediate image formed on the light emission side of the prism mirror 22.

The imaging optical system 20 is an off-axis optical system OS due to the see-through mirror 23 being a concave mirror, etc. In the case of the present embodiment, the projection lens 21, the prism mirror 22, and the see-through mirror 23 are disposed to be non-axially symmetrical and have an optical surface that is non-axisymmetric. The fact that the imaging optical system 20 is an off-axis optical system OS means that, in the optical elements 21, 22, 28, 23 constituting the imaging optical system 20, the optical path as a whole is bent before and after the light beam is incident on the plurality of reflection portions or refracting surfaces. In the imaging optical system 20, that is, the off-axis optical system OS, an optical axis AX is bent so that the optical axis AX extends along an off-axis surface (a surface parallel to the Y-Z surface) corresponding to a plane of the drawing, and the optical elements 21, 22, 28, 23 are arranged along the off-axis surface. When viewed in a cross section parallel to the Y-Z plane, the optical axis AX is arranged in a Z shape by a plurality of optical axis portions AX1, AX2, AX3 that are inclined to each other in front of and behind the reflection portion. In other words, in the off-axis surface parallel to the Y-Z plane, an optical path P1 from the projection lens 21 to an inner reflection portion 22b, an optical path P2 from the inner reflection portion 22b to the see-through mirror 23, and an optical path P3 from the see-through mirror 23 to the pupil position PP are bent in a Z shape in two stages. The off-axis surface (the surface parallel to the Y-Z plane) which is a reference surface extends parallel to the Y direction which is a longitudinal direction. In this case, the optical elements 21, 22, 28, 23 constituting the first display device 100a are arranged so that height positions thereof are changed in the longitudinal direction, and an increase in a transverse width of the first display device 100a can be prevented.

In the imaging optical system 20, the optical path P1 from the projection lens 21 to the inner reflection portion 22b extends obliquely upward toward the rear. That is, in the optical path P1, the optical axis portion AX1 extends in a direction near the intermediate between the −Z direction and the +Y direction. The optical path P2 from the inner reflection portion 22b to the see-through mirror 23 extends obliquely downward toward the front. That is, in the optical path P2, the optical axis portion AX2 extends in a direction near the intermediate between the +Z direction and the −Y direction. However, with respect to the water surface direction (X-Z plane), the inclination of the optical path P2 is greater than the inclination of the optical path P1. The optical path P3 from the see-through mirror 23 to the pupil position PP is in a state of being nearly parallel to the Z direction, but in the illustrated example, the optical axis portion AX3 is approximately −10° in the +Z direction with the downward direction being negative. That is, an emission optical axis EX which is an extension of the optical axis portion AX3 is inclined downward by approximately 10° with respect to a central axis HX parallel to the front +Z direction. This is because a line of sight of a human being is stable in a slightly lowered eye state in which the line of sight is inclined downward by approximately 10° with respect to a horizontal direction.

The incident portion 21a and the emission portion 21b of the first lens 21p constituting the projection lens (first optical member) 21 have asymmetry in the longitudinal direction parallel to the Y-Z plane and intersecting the optical axis AX with the optical axis AX interposed therebetween, and have symmetry in the horizontal direction or the X direction with the optical axis AX interposed therebetween. The incident portion 21c and the emission portion 21d of the second lens 21q constituting the projection lens 21 have asymmetry in the longitudinal direction parallel to the Y-Z plane and intersecting the optical axis AX with the optical axis AX interposed therebetween, and have symmetry in the horizontal direction or the X direction with the optical axis AX interposed therebetween. The first lens 21p and the second lens 21q are formed of, for example, a resin, but may also be made of glass. The incident portion 21a and the emission portion 21b of the first lens 21p are free-form surfaces, for example. The incident portion 21a and the emission portion 21b are not limited to free-form surfaces, and may be aspherical surfaces. The incident portion 21c and the emission portion 21d of the second lens 21q are free-form surfaces. The incident portion 21c and the emission portion 21d are not limited to free-form surfaces, and may be aspherical surfaces. An aberration reduction can be achieved by setting the incident portions 21a, 21c or the emission portions 21b, 21d to be free-form surfaces or aspherical surfaces, and the optical performance of an eccentric system is easily improved particularly when the free-form surfaces are used, whereby an aberration of the imaging optical system 20 which is a non-coaxial off-axis optical system OS can be easily reduced. Although detailed illustration is omitted, an antireflection film is formed at the incident portions 21a, 21c and the emission portions 21b, 21d.

The prism mirror (second optical member) 22 is a refractive reflection optical member having a function of combining a mirror and a lens, and reflects the image light ML from the projection lens 21 while refracting it. The prism mirror 22 causes the image light ML to be incident on the interior via the incident portion 22a, totally reflect the incident image light ML in the non-front direction by the inner reflection portion 22b, and emit the incident image light ML to the outside via the emission portion 22c. The incident portion 22a and the emission portion 22c are optical surfaces formed of curved surfaces, and contribute to resolution improvement compared to a case in which they are only the reflection portions or they are flat surfaces. The incident portion 22a, the inner reflection portion 22b, and the emission portion 22c which are the optical surfaces constituting the prism mirror 22 have asymmetry in the longitudinal direction parallel to the Y-Z plane and intersecting the optical axis AX with the optical axis AX interposed therebetween, and have symmetry in the horizontal direction or the X direction with the optical axis AX interposed therebetween. The prism mirror 22 may be formed of, for example, a resin, but may also be formed of glass. A refractive index of a main body of the prism mirror 22 is set to a value such that total reflection on the inner surface is achieved in consideration of a reflection angle of the image light ML. The optical surface of the prism mirror 22, that is, the incident portion 22a, the inner reflection portion 22b, and the emission portion 22c are, for example, free-form surfaces. The incident portion 22a, the inner reflection portion 22b, and the emission portion 22c are not limited to free-form surfaces, and may be aspherical surfaces. In the prism mirror 22, the aberration reduction can be achieved by setting the optical surfaces 22a, 22b, and 22c to be free-form surfaces or aspherical surfaces, and, in particular, when a free-form surface is used, the optical performance of the eccentric system is easily improved. The inner reflection portion 22b is not limited to one that reflects the image light ML by total reflection, and may be a reflection portion formed of a metal film or a dielectric multilayer film. In this case, a reflection film formed of a single layer film or multilayer film formed of a metal such as Al or Ag is formed at the inner reflection portion 22b by vapor deposition, etc., or a sheet-shaped reflection film formed of a metal is affixed thereto. Although detailed illustration is omitted, an antireflection film is formed at the incident portion 22a and the emission portion 22c.

A light blocking member 17 is disposed between the prism mirror 22 and the projection lens 21. The light blocking member 17 is disposed at a position close to the aperture pupil in which the image light ML is drawn as a whole. However, since the imaging optical system 20 is an off-axis optical system OS, the position of the aperture pupil differs with respect to the vertical Y direction or the horizontal X direction, and it is not an aperture stop in a strict sense. The light blocking member 17 is supported around at least one of the incident portion 22a on which the image light ML is incident in the prism mirror 22, and the emission portion 21d on which the image light ML is emitted in the projection lens 21. Here, the incident portion 22a and the emission portion 21d are not limited to outer edges of the incident portion 22a and the emission portion 21d, and include a flange portion (not illustrated) formed on the outer side of the incident portion 22a and the emission portion 21d. In a specific example, the light blocking member 17 is supported and fixed at the flange portion of the second lens 21q as described below. When viewed from a direction perpendicular to the optical axis portion AX1 of the image light ML incident on the incident portion 22a of the prism mirror 22, for example, when viewed from the ±X direction, a portion of the incident portion 22a of the prism mirror 22 protrudes from the light blocking member 17 toward the emission portion 21d of the projection lens 21. In other words, the incident portion 22a of the prism mirror 22 protrudes toward the emission portion 21d of the projection lens 21 via an opening 17a of the light blocking member 17. In this manner, the incident portion 22a of the prism mirror 22 protrudes toward the emission portion 21d of the projection lens 21 via the opening 17a of the light blocking member 17, so that the light blocking member 17 approaches the flange portion of the prism mirror 22, and the degree of freedom of positioning of the projection lens 21 and the prism mirror 22 increases. Therefore, it is easy to dispose the projection lens 21 and the prism mirror 22 in close proximity, which makes it possible to not only facilitate miniaturization of the imaging optical system 20, but also to reduce unintended light from penetrating into the gaps between the projection lens 21 and the prism mirror 22, and reduce the escape of unintended light from the gaps between the projection lens 21 and the prism mirror 22.

Although not illustrated in the drawings, a light blocking member such as the light blocking member 17 described above can be disposed between the first lens 21p and the second lens 21q that constitute the projection lens 21. In addition, between the prism mirror 22 and the wedge type optical element 28, a light blocking member such as the light blocking member 17 described above, that is, a light blocking member supported around the emission portion 22c of the prism mirror 22 and having the emission portion 22c protruding from the opening can be disposed in the vicinity of the prism mirror 22.

The wedge type optical element 28 is disposed between the prism mirror 22 and the see-through mirror 23, and has optical transparency. The wedge type optical element 28 has a role in improving an imaging state. The first surface 28a provided on the incident side of the wedge type optical element 28 is flat but has a free-form surface, has asymmetry in the longitudinal direction parallel to the Y-Z plane with the optical axis AX interposed therebetween, and has symmetry in the X direction or the horizontal direction perpendicular to the Y-Z plane with the optical axis AX interposed therebetween. An antireflection film is formed at the first surface 28a. The second surface 28b provided on the emission side of the wedge type optical element 28 is a flat surface, and an antireflective coating is formed. The wedge type optical element 28 increases in thickness on the +Z side, which is the front side. As a result, distortion aberration caused by the prism mirror 22, etc. can be suppressed. The refractive index of the wedge type optical element 28 is different from the refractive index of the prism mirror 22. As a result, the degree of refraction and dispersion can be adjusted between the wedge type optical element 28 and the prism mirror 22, etc., which facilitates achieving color cancellation, for example.

The see-through mirror 23 is a curved plate-shaped optical member that serves as a concave surface mirror, and reflects the image light ML from the prism mirror 22. That is, the see-through mirror 23 reflects the image light ML from the first optical system 12a toward the pupil position PP. The see-through mirror 23 covers the pupil position PP at which the eye EY or the pupil is disposed, has a concave shape toward the pupil position PP, and has a convex shape toward the outside. The see-through mirror 23 is a concave transmission mirror that covers the entire effective region of a screen in the view. The see-through mirror 23 is a collimator having a convergence function, and reflects the main ray of the image light ML temporarily spread by imaging in the vicinity of the emission region of the first optical system 12a, which is the main ray of the image light ML emitted from each of points on the display surface 11d, toward the pupil position PP and converges them at the pupil position PP. The see-through mirror 23 is a mirror plate having a structure in which a mirror film 23c having transmissive properties is formed at a front surface or a back surface of a plate-shaped body 23b. The see-through mirror 23 and the reflection portion 23a have asymmetry in the longitudinal direction parallel to the Y-Z plane and intersecting the optical axis AX with the optical axis AX interposed therebetween, and have symmetry in the horizontal direction or the X direction with the optical axis AX interposed therebetween. The reflection portion 23a of the see-through mirror 23 is, for example, a free-form surface. The reflection portion 23a is not limited to a free-form surface, and may be an aspherical surface. The aberration reduction can be achieved by setting the see-through mirror 23 to be a free-form surface or an aspherical surface, and, in particular, when a free-form surface is used, the aberration of the imaging optical system 20 which is an off-axis optical system or a non-coaxial optical system can be easily reduced.

The see-through mirror 23 is a transmissive type reflection element that allows transmission of some of light upon reflection, and the reflection portion 23a or the mirror film 23c of the see-through mirror 23 is formed by a reflection layer having a semi-transmissive property. Thus, because outside light OL passes through the see-through mirror 23, see-through view of the outside is enabled, and a virtual image can be superimposed on an outside image. At this time, when the plate-shaped body 23b that supports the mirror film 23c has a thickness of less than or equal to approximately a few millimeters, a change in the magnification of the outside image can be suppressed to be small. A reflectance of the mirror film 23c with respect to the image light ML and the outside light OL shall be 10% to 50% in a range of an incident angle of the assumed image light ML from the viewpoint of ensuring the brightness of the image light ML and facilitating the observation of the outside image by see-through. The plate-shaped body 23b which is a base material of the see-through mirror 23 is formed of, for example, a resin, and may also be formed of glass. The plate-shaped body 23b is formed of the same material as the support plate 83 that supports the plate-shaped body 23b from the surroundings thereof, and has the same thickness as the support plate 83. The mirror film 23c is formed of, for example, a dielectric multilayer film configured of a plurality of dielectric layers having an adjusted film thickness. The mirror film 23c may be a single-layer film or a multilayer film of a metal such as Al or Ag of which a film thickness has been adjusted. The mirror film 23c may be formed by laminating, and may also be formed by affixing a sheet-shaped reflection film. An antireflection film is formed at an outer surface 23o of the plate-shaped body 23b.

In describing the optical path, the image light ML from the first image element 11a is emitted from the projection lens 21 in a state of being incidentally incident on the projection lens 21 and is substantially collimated. The image light ML that has passed through the projection lens 21 is incident on the prism mirror 22, passes through the incident portion 22a while being refracted by it, is reflected by the inner reflection portion 22b with a high reflectance close to 100%, and is refracted again by the emission portion 22c. The image light ML from the prism mirror 22 is incident on the see-through mirror 23 via the wedge type optical element 28, and is reflected by the reflection portion 23a with a reflectance of about 50% or less. The image light ML reflected by the see-through mirror 23 is incident on the pupil position PP at which the eye EY or pupil of the wearer US is placed. The outside light OL that has passed through the see-through mirror 23 and a support plate 83 therearound is also incident on the pupil position PP. In other words, the wearer US wearing the first display device 100a can observe a virtual image of the image light ML in a state in which the image light ML overlaps with the outside image.

Figure 5:
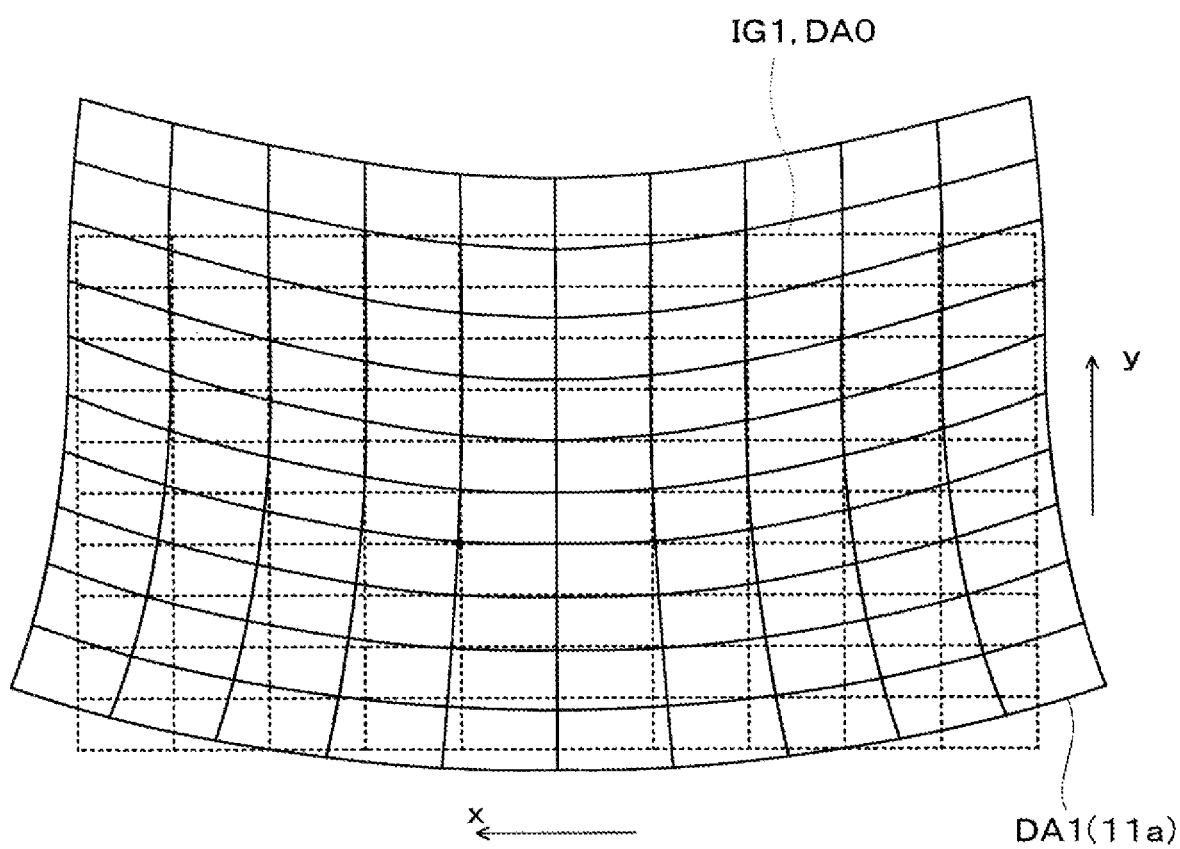
FIG. 5 is a diagram illustrating distortion correction of a display image.

As illustrated in FIG. 5, the display image formed at the display surface 11d of the first image element 11a is set to a modified image DA1 having a distortion such as trapezoidal distortion. That is, since the imaging optical system 20 is the off-axis optical system OS, it is not easy for the optical system itself to remove distortion such as trapezoidal distortion. In this way, a pixel array of a projected image IG1 of the virtual image observed at the pupil position PP via the imaging optical system 20 can be made into a grid pattern corresponding to an original display image DA0, and the outline thereof can be made rectangular by causing the image displayed on the first image element 11a to have reverse distortion that cancels out the distortion formed by the projection lens 21, the prism mirror 22, the wedge type optical element 28, and the see-through mirror 23. In other words, the first image element 11a corrects the distortion formed by the projection lens 21, the prism mirror 22, the wedge type optical element 28, and the see-through mirror 23. As a result, aberrations can be suppressed as a whole including the first image element 11a while allowing the distortion generated by the see-through mirror 23, etc. Thus, the degree of freedom in the arrangement and size of optical elements such as the prism mirror 22 is increased, and it is possible to easily secure the optical performance of the first display device 100a while achieving miniaturization of the first display device 100a.

Figure 6:
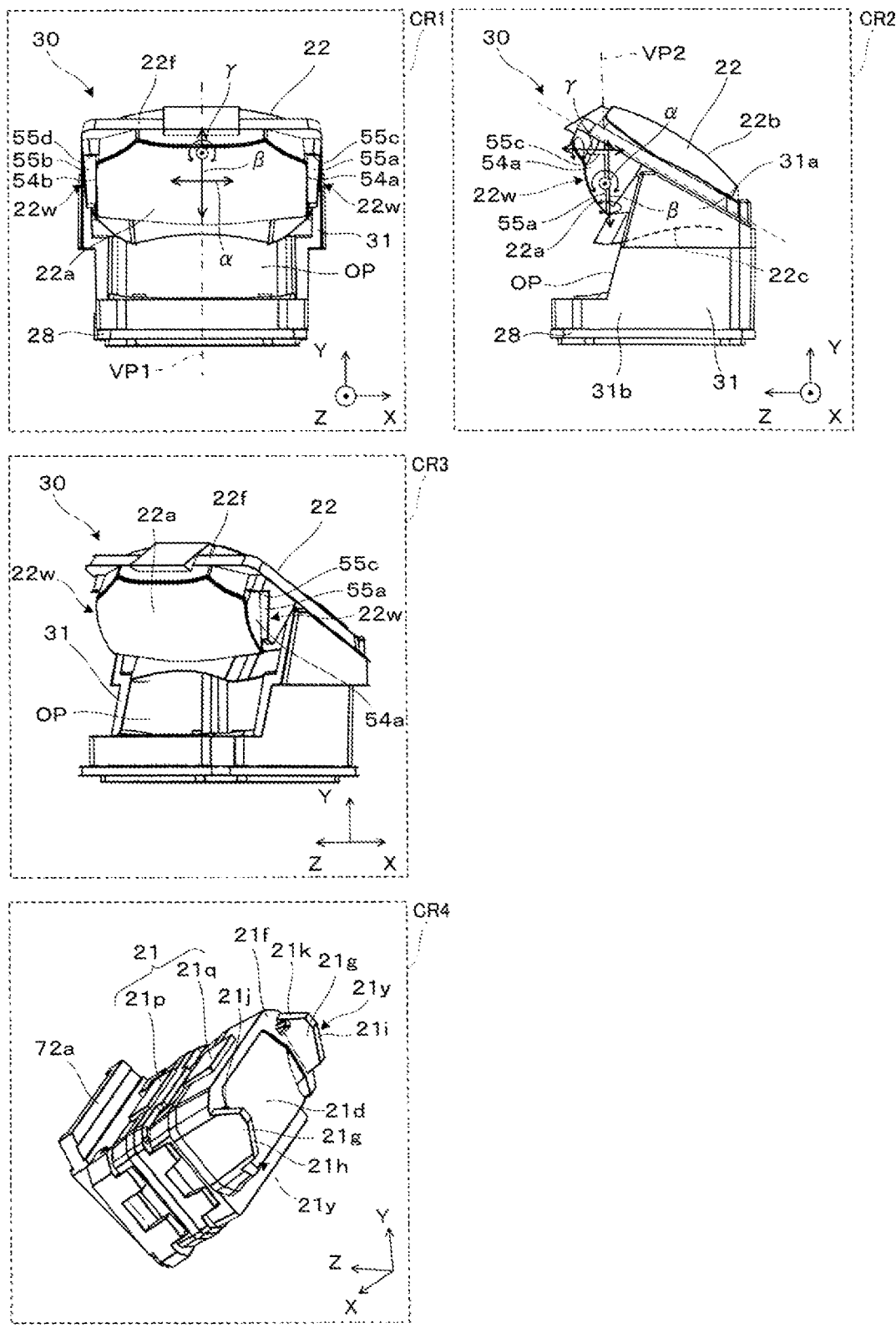
FIG. 6 is a diagram illustrating the positioning of a projection lens with respect to a prism mirror.

The fixing of the projection lens 21 with respect to the prism mirror 22 will be described with reference to FIG. 6. In FIG. 6, a region CR1 is a front view of the optical block 30 in which the prism mirror 22, etc. is attached to the barrel 31, a region CR2 is a side view of the optical block 30, a region CR3 is a perspective view of the optical block 30, a region CR4 is a perspective view of the projection lens 21. The projection lens 21 is directly fixed to the prism mirror 22 of the optical block 30. At this time, the projection lens 21 is fixed to the prism mirror 22 in a state of being positioned using the fitting the one-sided alignment.

The prism mirror 22 has a pair of notches 22w at a position facing the projection lens 21, the pair of notches 22w having a pair of restriction surfaces 54a, 54b parallel to a first imaginary plane VP1. Here, the first imaginary plane VP1 is a plane including the optical axis portion AX1 (see FIG. 4) of the image light ML incident on the incident portion 22a of the prism mirror 22 and the optical axis portion AX2 (see FIG. 4) of the image light ML emitted from the emission portion 22c, and coincides with the off-axis surface of the off-axis optical system OS. On the other hand, the second lens 21q of the projection lens 21 has a pair of claws 21y as a pair of fitting members in a flange portion 21f. The pair of claws 21y have a pair of inner surfaces 21g parallel to the first imaginary plane VP1. When fixing the projection lens 21 to the prism mirror 22, the pair of claws 21y of the prism mirror 22 are inserted into the pair of notches 22w formed at the prism mirror 22, and the pair of claws 21y sandwich the pair of notches 22w when viewed from a direction parallel to the optical axis portion AX1. As a result, the pair of restriction surfaces 54a, 54b provided at the prism mirror 22 and the inner surfaces 21g provided at the projection lens 21 face each other, whereby the positioning in the X direction perpendicular to the first imaginary plane VP1 is enabled. As described above, the projection lens 21 is positioned with respect to the prism mirror 22 or the optical block 30 in the horizontal X direction.

The pair of notches 22w provided at the prism mirror 22 include a pair of first positioning surfaces 55a, 55b that extend parallel to a plane extending in a substantially vertical direction perpendicular to the first imaginary plane VP1 (that is, the second imaginary plane VP2 substantially parallel to the X-Y plane), and a pair of second positioning surfaces 55c, 55d that extend parallel to a plane extending substantially horizontally that extends substantially horizontally, perpendicular to the first imaginary plane VP1 and the second imaginary plane VP2 (that is, a plane substantially parallel to the X-Z plane). On the other hand, the pair of claws 21y of the second lens 21q have a pair of reference surfaces 21h, 21i that abut the pair of first positioning surfaces 55a, 55b provided at the pair of notches 22w of the prism mirror 22. In addition, the pair of claws 21y of the second lens 21q have a pair of reference surfaces 21j, 21k that abut the second positioning surfaces 55c, 55d provided at the pair of notches 22w of the prism mirror 22. As described above, the projection lens 21 is positioned with high accuracy with respect to the X direction and the Y direction with respect to the prism mirror 22.

In the above, the pair of first positioning surfaces 55a, 55b are a pair of band-shaped planes and are spaced apart in the X direction with the optical axis AX of the image light ML interposed therebetween, and extend substantially parallel to the Y direction. By extending the pair of first positioning surfaces 55a, 55b substantially parallel to the Y direction, rotation of the second lens 21q or the projection lens 21 about an axis α parallel to the X direction can be restricted. In addition, by spacing the pair of first positioning surfaces 55a, 55b in the X direction with the optical axis AX interposed therebetween, rotation of the second lens 21q or the projection lens 21 about an axis β that is substantially parallel to the Y direction can be restricted. Furthermore, the second positioning surfaces 55c, 55d are a pair of planes that are spaced apart in the X direction with the optical axis AX of the image light ML interposed therebetween. As a result, the rotation of the second lens 21q or the projection lens 21 about an axis γ substantially parallel to the Z direction can be restricted by the second positioning surfaces 55c, 55d. As described above, the rotational posture of the projection lens 21 can be appropriately set with respect to the intersecting three axes α, β, and γ.

As described above, the projection lens 21 is positioned with respect to a flange portion 22f of the prism mirror 22 by utilizing (1) the fitting in which the sandwitching is performed by the first restriction surface 54a and the first restriction surface 54b, and (2) one-sided alignment against the first positioning surface 55a, 55b and the second positioning surface 55c, 55d. The projection lens 21 is fixed to the prism mirror 22 by using a photocurable adhesive, an ultrasonic fusion method, etc. while maintaining this positioning state.

Figure 7:
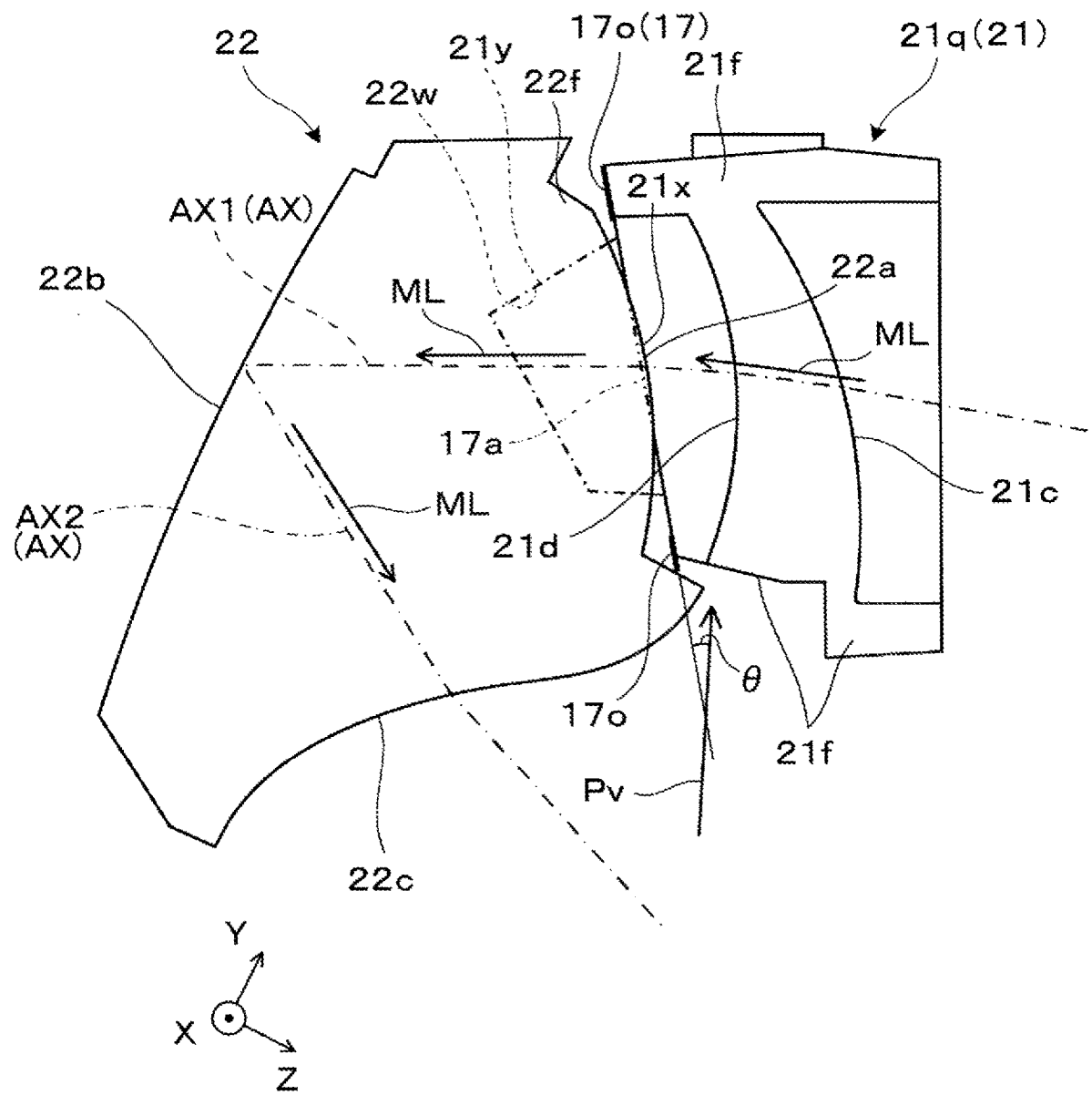
FIG. 7 is a side cross-sectional view illustrating coupling between a prism mirror and a second lens.

Referring to FIG. 7, the light blocking member 17 is fixed to an end surface of the flange portion 21f provided at the second lens 21q of the projection lens 21. The light blocking member 17 is obtained by forming the opening 17a on the inside of an edge portion 17o having a rectangular frame-shaped profile. The light blocking member 17 cuts peripheral part of the image light ML emitted from the emission portion 21d of the second lens 21q, and selectively causes only the image light ML passing through the effective region of the emission portion 21d through the opening 17a surrounded by the edge portion 17o to be selectively incident on the incident portion 22a of the prism mirror 22. Here, when viewed from the X direction perpendicular to the optical axis portion AX1 of the image light ML, an apex 21x of the emission portion 21d of the projection lens 21 and the periphery thereof protrude from the light blocking member 17 toward the emission portion 21d of the projection lens 21. In other words, the apex 21x of the emission portion 21d and the periphery thereof extend beyond the opening 17a of the light blocking member 17 and extend to the projection lens 21 side. The light blocking member 17 is formed, for example, from a metal plate of SUS, etc., and the surface thereof is coated with a material having light absorptivity (specifically, a black material), is plated with a material having light absorptivity, or a material having light absorptivity is deposited. The thickness of the light blocking member 17 is, for example, from several tens of μm to several hundreds of μm, and more specifically, for example, from 20 μm to 300 μm. When the light blocking member 17 has this degree of thickness, the shape design of the flange portions 21f, 22f for arrangement between the projection lens 21 and the prism mirror 22 is facilitated.

Figure 8:
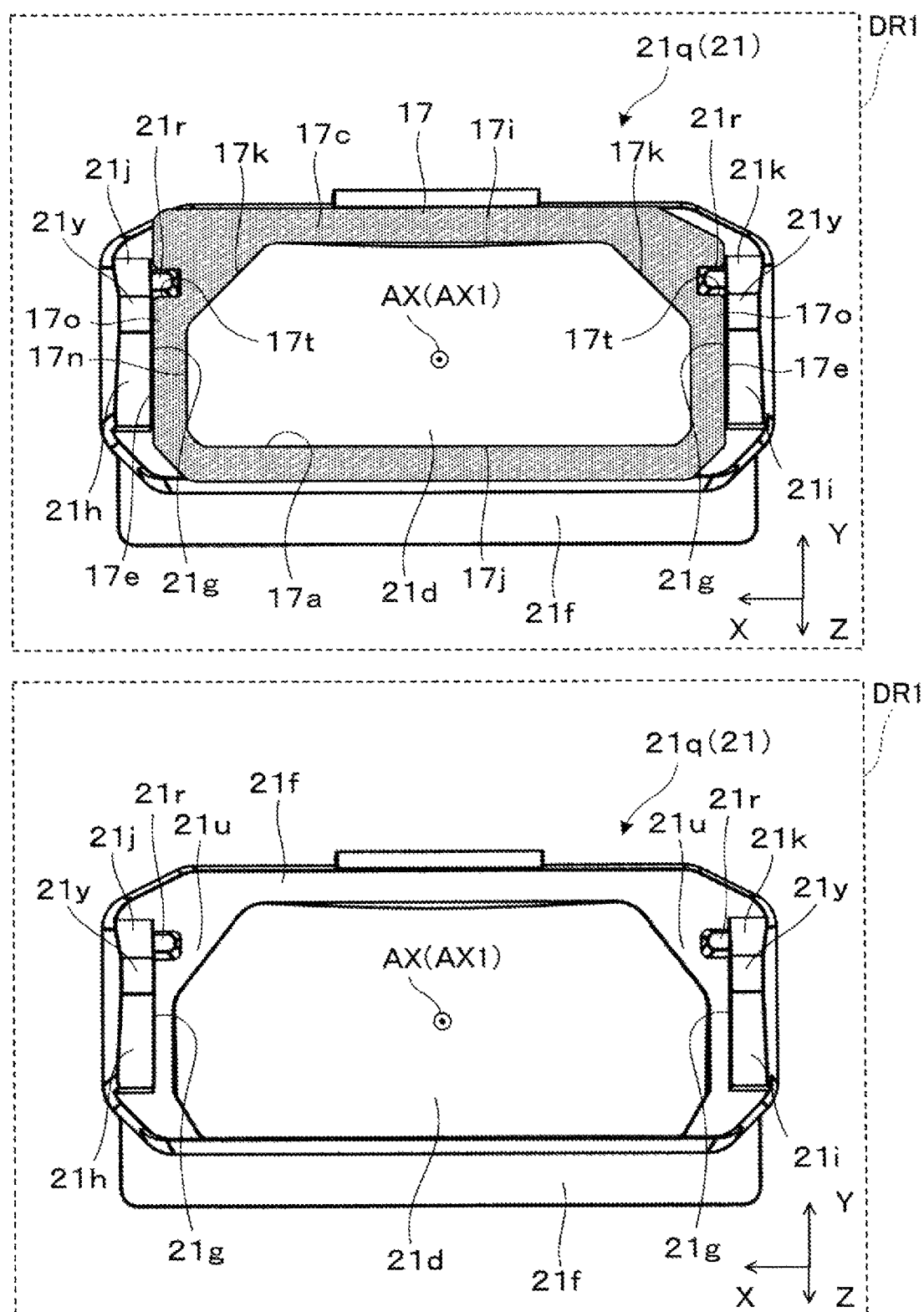
FIG. 8 is a diagram illustrating an attachment state of a light blocking member to the second lens.

FIG. 8 is a view of the attachment state of the light blocking member 17 to the second lens 21q as viewed from the optical axis AX direction. In FIG. 8, a region DR1 illustrates a state in which the light blocking member 17 is attached to the second lens 21q, and a region DR2 illustrates a state in which the light blocking member 17 is removed from the second lens 21q. The light blocking member 17 is gripped by the pair of claws 21y provided at the flange portion 22f of the second lens 21q. In other words, the light blocking member 17 is positioned so as to be disposed between the pair of claws 21y. As described in more detail, the edge portion 17o of the light blocking member 17 is adhered to and fixed to the flange portion 22f while being sandwiched by the pair of claws 21y provided at the flange portion 22f of the second lens 21q. At this time, not only the back surface of the edge portion 17o of the light blocking member 17 abuts an upper surface 21u of the flange portion 22f, but also a pair of outer edges 17e of the edge portion 17o is sandwiched between the inner side surfaces 21g of the pair of claws 21y, and a pair of notches 17t formed in the edge portion 17o fits with a protrusion 21r formed at the base of the pair of claws 21y. As a result, the translation and rotation of the light blocking member 17 with respect to the second lens 21q can be restricted, and the light blocking member 17 can be positioned with respect to the second lens 21q. In other words, the arrangement of the light blocking member 17 in the X direction, Y direction, and Z direction with respect to the second lens 21q is appropriately set, and the rotational posture of the light blocking member 17 around the X, Y, and Z axes with respect to the second lens 21q is appropriately set.

The opening 17a of the light blocking member 17 has a trapezoidal or D-type profile. When comparing an upper side 17i of the opening 17a on the +Y side to a lower side 17j of the opening 17a on the −Y side, the upper side 17i, which is one side, is shorter than the lower side 17j, which is the other side. In response to this difference, hypotenuses 17k that spread toward the −Y side or the lower side of the drawing are formed at a pair of side sides 17n coupling the upper side 17i and the lower side 17j. Considering the asymmetry of the luminous flux cross section of the image light ML emitted from the emission portion 21d of the second lens 21q, the opening 17a of the light blocking member 17 is narrowed on the upper side and widened on the lower side. That is, due to the fact that the imaging optical system 20 is an off-axis optical system OS, the luminous flux cross section of the image light ML has an asymmetry that is relatively longer in the horizontal X direction than in the vertical direction parallel to YZ and perpendicular to the optical axis portion AX1, and spreads in the −Y side rather than the +Y side. The shape of the opening 17a of the light blocking member 17 is set so as to conform to the luminous flux cross section of the image light ML having asymmetry in this manner.

Figure 9:
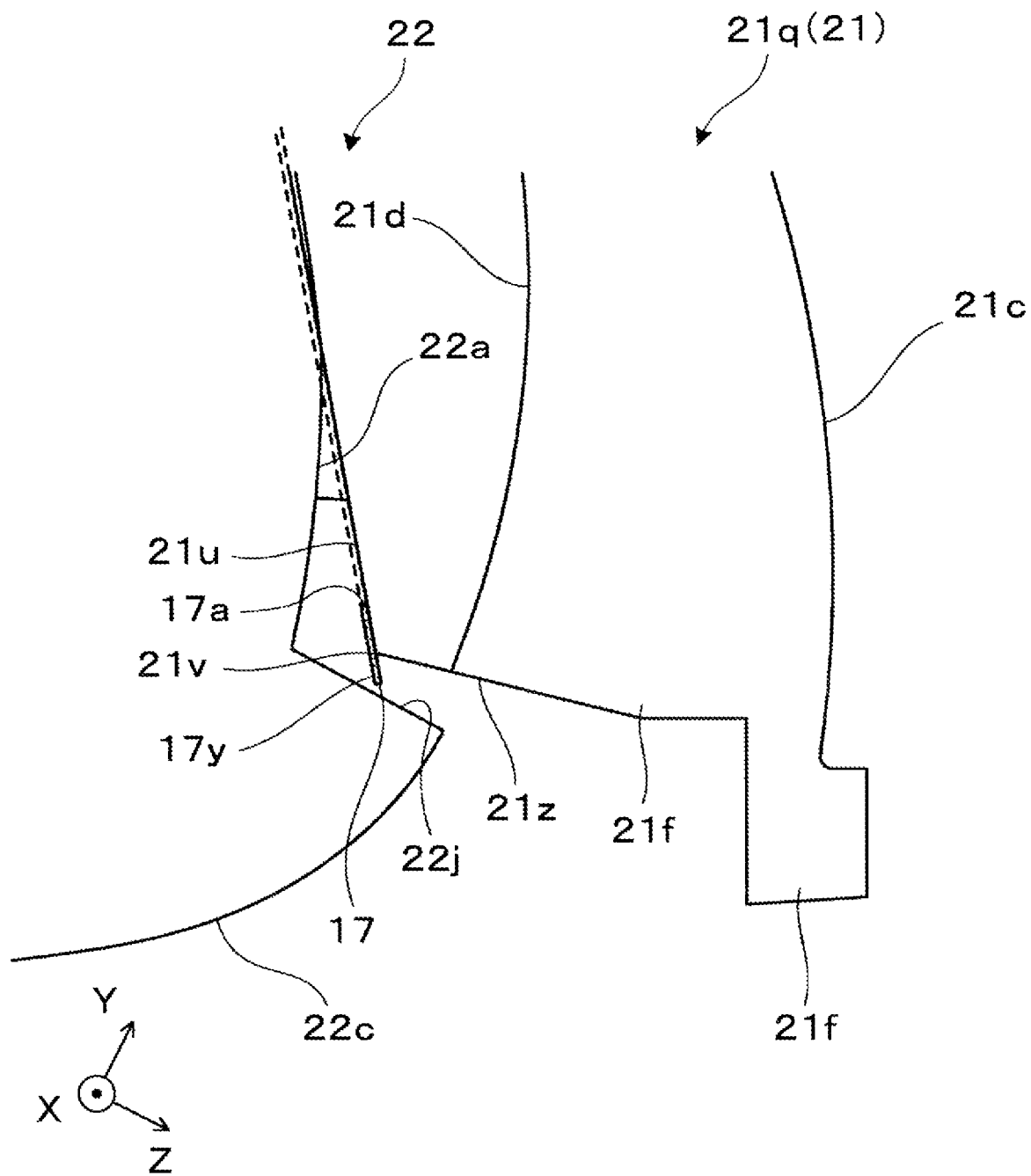
FIG. 9 is an enlarged side cross-sectional view illustrating a periphery of a lower end of the light blocking member.

As illustrated in enlarged view in FIG. 9, when viewed from the horizontal X direction, a lower end portion 17y of the light blocking member 17 protrudes outward from a lower frame 21v of the second lens 21q or the emission portion 21d of the projection lens 21. Here, the horizontal X direction corresponds to a direction parallel to a normal line of a plane (corresponding to the first imaginary plane VP1 in FIG. 6) including the optical axis portion AX1 of the image light ML incident on the incident portion 22a of the prism mirror 22 and the optical axis portion AX2 of the image light ML emitted from the emission portion 22c of the prism mirror 22. In the illustrated example, the lower frame 21v of the emission portion 21d of the second lens 21q is the lower end of the emission portion 21d, and the lower end 17y of the light blocking member 17 protrudes outward from the lower frame 21v of the emission portion 21d. When the flange portion 21f spreads outward from the emission portion 21d, the lower end portion 17y of the light blocking member 17 can protrude outward from an extended surface of an outer surface 21z of the flange portion 21f. The protruding direction of the lower end portion 17y of the light blocking member 17 is between the −Y direction and the +Z direction. In this manner, by projecting the lower end 17y of the light blocking member 17 outward from the lower frame 21v of the emission portion 21d of the second lens 21q, it is possible to prevent the image light ML emitted from the emission portion 21d of the second lens 21q from entering the prism mirror 22 from the outside of the incident portion 22a of the prism mirror 22 and becoming stray light. When the lower end 17y of the light blocking member 17 does not protrude sufficiently, the image light ML emitted from the emission portion 21d may be incident on the interior of the prism mirror 22 via a stepped coupling surface 22j formed between the incident portion 22a and the emission portion 22c of the prism mirror 22. Note that the lower end 17y of the light blocking member 17 does not need to protrude outward from the lower frame 21v of the emission portion 21d of the second lens 21q over the entire horizontal X direction, but may protrude outward with respect to the key position of the lower frame 21v.

Returning to FIG. 7, the light blocking member 17 is supported inclinedly rather than being perpendicular to the optical axis portion AX1 of the image light ML emitted from the emission portion 21d of the second lens 21q or the projection lens 21. In other words, the light blocking member 17 is inclined at an angle θ with respect to the plane Pv perpendicular to the optical axis portion AX1 of the image light ML emitted from the emission portion 21d of the projection lens 21. In this way, by inclining the light blocking member 17 with respect to the plane Pv perpendicular to the optical axis portion AX1, the posture of the light blocking member 17 with respect to the image light ML can be appropriately set, the arrangement of the light blocking member 17 using the gap between the light blocking member 17 and the second lens 21q can be made reasonable, and the structure for supporting the light blocking member 17 can be simplified.

Figure 10:
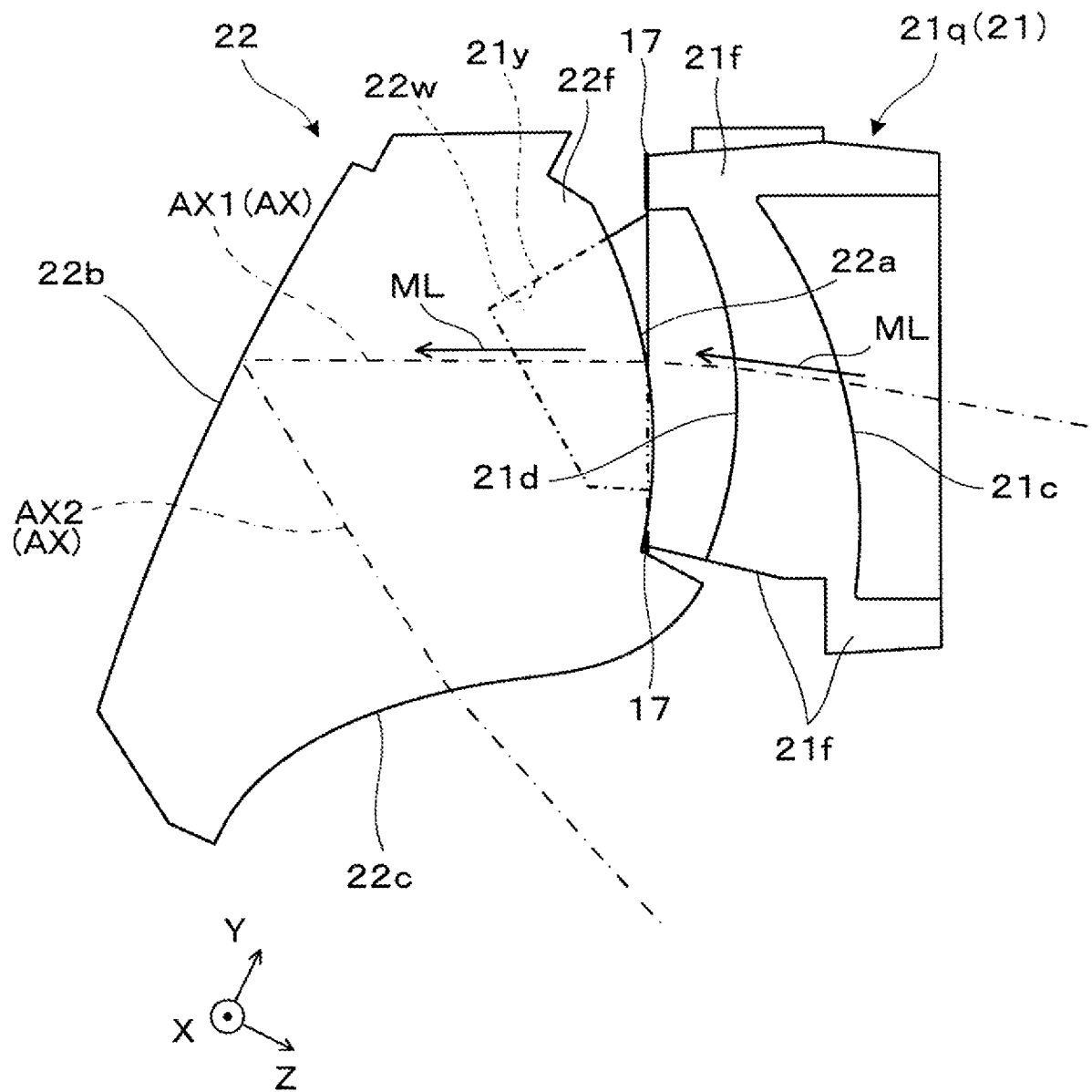
FIG. 10 is a diagram illustrating a modification example of the attachment state of the light blocking member with respect to the second lens.

FIG. 10 illustrates a modification example of the arrangement of the light blocking member 17, where the light blocking member 17 is supported vertically with respect to the optical axis portion AX1 of the image light ML emitted from the emission portion 21d of the second lens 21q or the projection lens 21. In this case as well, a portion of the emission portion 21d of the projection lens 21 protrudes from the light blocking member 17 toward the emission portion 21d of the projection lens 21.

Note that the light blocking member 17 is not limited to being fixed to the second lens 21q, and may be fixed to the prism mirror 22. Additionally, in the description above, the pair of claws 21y are provided at the second lens 21q, the pair of notches 22w are provided at the prism mirror 22, and the second lens 21q is fixed to the prism mirror 22. However a fitting structure can be employed in which a pair of claw-shaped protrusions are provided at the prism mirror 22 and a pair of notches are provided in the second lens 21q to receive the pair of claw-shaped protrusions, and in this case, the second lens 21q can be fixed while being positioned with respect to the prism mirror 22.

The arrangement of the light blocking member 17 is not limited to such that a portion of the emission portion 21d of the projection lens 21 protrudes from the light blocking member 17 toward the emission portion 21d of the projection lens 21, and may be such that the entirety of the emission portion 21d of the projection lens 21 may protrude from the light blocking member 17 toward the emission portion 21d of the projection lens 21, and the entirety of the emission portion 21d of the projection lens 21 may not protrude from the light blocking member 17 toward the emission portion 21d of the projection lens 21. Further, depending on the optical design, the emission portion 21d of the projection lens 21 may be convex, and in such a case, at least a portion of the emission portion 21d of the projection lens 21 may protrude from the light blocking member 17 toward the emission portion 21d of the projection lens 21.

The optical module 100 of the image display device 200 or HMD201 of the first exemplary embodiment described above includes the first image element 11a, the projection lens 21 that is the first optical member configured to emit the image light ML from the emission portion 21d, the image light ML being incident from the first image element 11a, the prism mirror 22 that is the second optical member configured to cause the image light ML from the projection lens 21 to be incident from the incident portion 22a, the first combiner 103a configured to reflect the image light ML from the prism mirror 22 toward the pupil position PP, and the light blocking member 17 supported around at least one of the incident portion 22a of the prism mirror 22 and the emission portion 21d of the projection lens 21, wherein when viewed from a direction perpendicular to the optical axis AX of the image light ML incident on the incident portion 22a of the prism mirror 22, at least a portion of the incident portion 22a of the prism mirror 22 protrudes from the light blocking member 17 toward the emission portion 21d of the projection lens 21. In this manner, at least a portion of the incident portion 22a of the prism mirror (second optical member) 22 protrudes from the light blocking member 17 toward the emission portion 21d of the projection lens (first optical member) 21, whereby the light blocking member 17 can be moved closer to the prism mirror 22, and the stray light generated by increasing the distance between the projection lens 21 and the prism mirror 22 can be reduced.

Second Exemplary Embodiment

An HMD or an optical module according to a second exemplary embodiment of the present disclosure will be described below. Note that the HMD, etc. of the second exemplary embodiment is a partial modification of the HMD, etc. of the first exemplary embodiment, and descriptions of common parts will be omitted.

Figure 11:
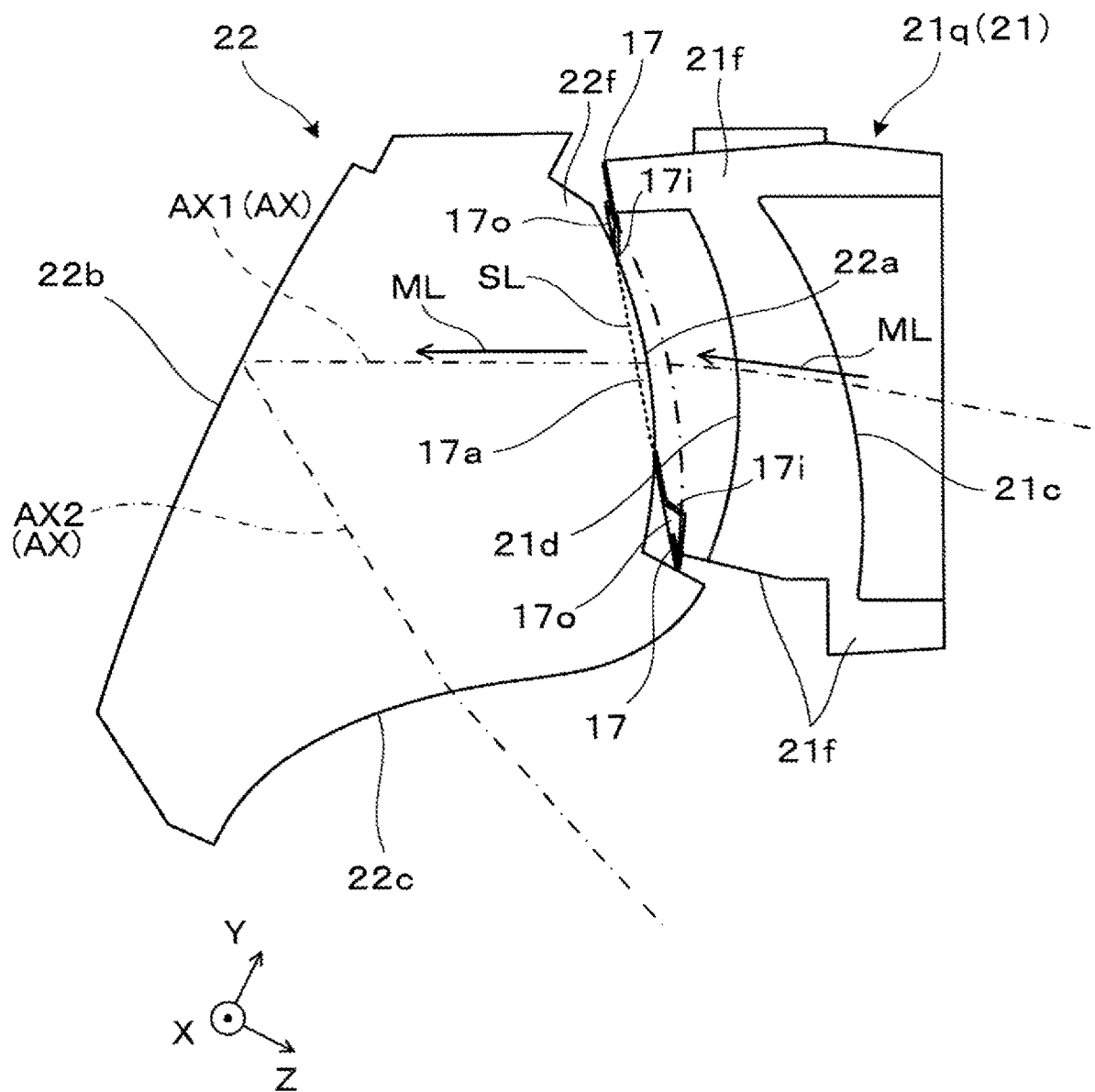
FIG. 11 is a side cross-sectional view illustrating a light blocking member in an HMD of a second exemplary embodiment.

FIG. 11 is a cross-sectional view illustrating a shape of the light blocking member 17 disposed between the projection lens 21 and the second lens 21q in the HMD201 or the optical module 100 of the second exemplary embodiment. In this case, the light blocking member 17 has a shape along a curved surface CS, and the edge portion 17o surrounding the opening 17a of the light blocking member 17 has a curved surface shape. That is, the light blocking member 17 has a curvature when viewed from the X direction perpendicular to the first imaginary plane VP1 (see FIG. 6), and also has a curvature when viewed from a direction perpendicular to the optical axis portion AX1 (approximately the Y direction) parallel to the first imaginary plane VP1. The curved surface CS may be a spherical surface, but may be an elliptical surface, a toroidal surface, etc. In this case as well, when viewed from the X direction perpendicular to the optical axis portion AX1 of the image light ML, the emission portion 21d of the projection lens 21 protrudes from the light blocking member 17 toward the emission portion 21d of the projection lens 21. In other words, the emission portion 21d of the projection lens 21 extends to the emission portion 21d side of the projection lens 21 beyond a line segment SL coupling the upper side 17i and the lower side 17j of the edge portion 17o of the light blocking member 17. Although not illustrated in the drawings, the emission portion 21d of the projection lens 21 extends to the emission portion 21d side of the projection lens 21 beyond a line segment coupling the pair of side sides of the light blocking member 17, but the line segment may not be exceeded. Due to the imaging optical system 20 being the off-axis optical system OS, the light flux passing through the opening 17a of the light blocking member 17 has a cross-section that is asymmetric and the asymmetry thereof also changes along the optical axis AX. Thus, by curving the edge portion 17o of the light blocking member 17, appropriate light blocking that is less wasteful is possible. The curved light blocking member 17 can be easily manufactured by, for example, sheet metal machining.

Modification Examples and Others

The present disclosure is described according to the above-described exemplary embodiments, but the present disclosure is not limited to the above-described exemplary embodiments. The present disclosure may be carried out in various modes without departing from the gist of the present disclosure, and, for example, the following modifications may be carried out.

The imaging optical system 20 incorporated into the first display device 100a is not limited to that illustrated, and may have various configurations. Specifically, the imaging optical system 20 described above is the off-axis optical system OS that is asymmetric in the Y direction or the longitudinal direction, but may also be an off-axis optical system that is asymmetric in the X direction or the horizontal direction. The optical elements constituting the imaging optical system 20 are merely exemplary in FIG. 4, and changes can be made, such as increasing or decreasing the number of lenses, adding a mirror, and adding a light-guiding member, etc.

A light control device that controls light by limiting the transmitted light of the combiners 103a, 103b can be attached on an external side of the combiners 103a, 103b. The light control device adjusts a transmittance, for example, electrically. Mirror liquid crystals, electronic shades, etc. may be used as the light control device. The light control device may adjust a transmittance according to outside light brightness.

The combiner 103a, 103b may be replaced with a mirror having light blocking properties. In this case, the optical system is a non-see-through type optical system that does not assume direct observation of an outside image.

A first optical module according to a specific aspect includes an image element configured to emit image light, a first optical member configured to cause the image light emitted from the image element to exit from an emission portion, a second optical member configured to cause the image light emitted from the first optical member to be incident from the incident portion, reflect off an inner reflection portion, and exit from the emission portion, and a combiner configured to reflect the image light emitted from the second optical member toward a pupil position, and a light blocking member supported by at least one optical member of the incident portion of the second optical member and the emission portion of the first optical member, wherein a portion of the incident portion of the second optical member protrudes from the light blocking member toward the emission portion of the first optical member when viewed from a direction parallel to a normal line of an imaginary plane including an optical axis of the image light incident on the incident portion of the second optical member and an optical axis of the image light emitted from the emission portion of the second optical member.

In the optical module described above, at least a portion of the incident portion of the second optical member protrudes from the light blocking member toward the emission portion of the first optical member, whereby the light blocking member can be moved closer to the second optical member, and the stray light generated by increasing the distance between the first optical member and the second optical member can be reduced.

In a specific aspect, when viewed from a direction parallel to the optical axis of the image light incident on the incident portion of the second optical member, the light blocking member is disposed between a pair of fitting members provided at one optical member, the pair of fitting members being configured to position the first optical member and the second optical member.

A second optical module according to a specific aspect includes an image element configured to emit image light, a first optical member configured to cause the image light emitted from the image element to exit from an emission portion, a second optical member configured to cause the image light emitted from the first optical member to be incident from the incident portion, reflect off an inner reflection portion, and exit from the emission portion, and a combiner configured to reflect the image light emitted from the second optical member toward a pupil position, and a light blocking member supported by at least one optical member of the incident portion of the second optical member and the emission portion of the first optical member, wherein when viewed from a direction parallel to the optical axis of the image light incident on the incident portion of the second optical member, the light blocking member is disposed between a pair of fitting members provided at one optical member, the pair of fitting members being configured to position the first optical member and the second optical member.

In the optical module described above, the light blocking member is disposed and positioned between the pair of fitting members that position the first optical member and the second optical member, whereby the light blocking member can be moved closer to the first optical member or the second optical member, and the stray light generated by increasing the distance between the first optical member and the second optical member can be reduced.

In a specific aspect, the opening provided in the light blocking member has a pair of sides, and one side is shorter than the other side. In this case, efficient light blocking is possible even when the luminous flux cross section has asymmetry in a specific direction perpendicular to the optical axis, and specifically in a direction orthogonal to the pair of sides.

In a specific aspect, the light blocking member is perpendicular to the optical axis of the image light emitted from the emission portion of the first optical member.

In a specific aspect, the light blocking member is inclined with respect to a state perpendicular to the optical axis of the image light emitted from the emission portion of the first optical member. In this case, even when the luminous flux cross section is asymmetric with respect to a specific direction perpendicular to the optical axis, efficient light blocking can be achieved by matching the direction in which the inclination of the light blocking member occurs in the specific direction.

In a specific aspect, the light blocking member has a curvature when viewed from a direction parallel to the normal line of the imaginary plane including the optical axis of the image light incident on the incident portion of the second optical member and the optical axis of the image light emitted from the emission portion of the second optical member. In this case, it is possible to address a case in which the proper arrangement along the optical axis of the light blocking member is different with respect to two directions orthogonal to the optical axis.

In a specific aspect, the thickness of the light blocking member is 20 µm to 300 µm.

In a specific aspect, when viewed from a direction parallel to the normal line of the plane including the optical axis of the image light incident on the incident portion of the second optical member and the optical axis of the image light emitted from the emission portion of the second optical member, the light blocking member protrudes outward from the frame of the emission portion of the first optical member. In this case, the image light emitted from the emission portion of the first optical member can be prevented from entering the second optical member from outside the incident portion of the second optical member and becoming stray light.

In a specific aspect, a head-mounted display device includes the above-mentioned optical module and a control device for causing the image element to perform display operation.

What is claimed is:

1. An optical module comprising:
   an image element that emits an image light;
   a first optical member that includes a first emission portion emitting the image light from the image element;
   a second optical member that includes:
      an incident portion on which the image light from the first optical member is incident,
      a second emission portion that emits the image light, and
      a reflection portion that reflects the image light from the incident portion toward the second emission portion;
   a combiner that reflects the image light from the second optical member toward a pupil position; and
   a light blocking member that is supported on at least one side of a side of the incident portion of the second optical member and a side of the first emission portion of the first optical member, and that blocks a part of the image light, wherein
   a portion of the incident portion of the second optical member protrudes from the light blocking member toward the first emission portion of the first optical member when viewed from a direction along a normal line of a lateral cross section that includes the first optical member, the second optical member, and the combiner.

2. The optical module according to claim 1, wherein
when viewed from a direction parallel to an optical axis of the image light incident on the incident portion of the second optical member, the light blocking member is disposed between a pair of fitting members provided on the one side, the pair of fitting members being configured to position the first optical member and the second optical member.

3. The optical module according to claim 1, wherein
an opening provided at the light blocking member has a pair of sides, one side being shorter than the other side.

4. The optical module according to claim 1, wherein
the light blocking member is perpendicular to an optical axis of the image light emitted from the first emission portion of the first optical member.

5. The optical module according to claim 1, wherein
the light blocking member is inclined with respect to an optical axis of the image light emitted from the first emission portion of the first optical member.

6. The optical module according to claim 1, wherein
the light blocking member has a curvature when viewed from a direction parallel to a normal line of the lateral cross section.

7. The optical module according to claim 1, wherein
a thickness of the light blocking member is 20 µm to 300 µm.

8. The optical module according to claim 1, wherein
the light blocking member projects outward from the emission portion of the first optical member when viewed from a direction parallel to a normal line of the lateral cross section.

9. A head-mounted display device comprising:
the optical module according to claim 1; and
a control device configured to control display operation of the image element.

10. An optical module comprising:
an image element configured to emit image light;
a first optical member including a first emission portion configured to emit the image light from the image element;
a second optical member including an incident portion on which the image light from the first optical member is incident, a second emission portion configured to emit the incident image light, and a reflection portion configured to reflect the image light from the incident portion toward the second emission portion;
a combiner configured to reflect the image light from the second optical member toward a pupil position; and
a light blocking member supported on at least one side of a side of the incident portion of the second optical member and a side of the first emission portion of the first optical member, and configured to block part of the image light, wherein
when viewed from a direction parallel to an optical axis of the image light incident on the incident portion of the second optical member, the light blocking member is disposed between a pair of fitting members provided on the one side, the pair of fitting members being configured to position the first optical member and the second optical member.

* * * * *